May 29, 1962 C. L. SHARP 3,036,874
PRESSURE RESPONSIVE PLUNGER RING
Filed Sept. 21, 1959 2 Sheets-Sheet 1

INVENTOR.
CHESTER L. SHARP
BY
*Jerry J. Dunlap*
ATTORNEY

May 29, 1962 C. L. SHARP 3,036,874
PRESSURE RESPONSIVE PLUNGER RING
Filed Sept. 21, 1959 2 Sheets-Sheet 2

INVENTOR.
CHESTER L. SHARP
BY
ATTORNEY

United States Patent Office 3,036,874
Patented May 29, 1962

3,036,874
PRESSURE RESPONSIVE PLUNGER RING
Chester L. Sharp, Tulsa, Okla., assignor to Douglas O. Johnson and Leo W. Fagg, doing business as Johnson-Fagg Engineering Company, Tulsa, Okla., a co-partnership
Filed Sept. 21, 1959, Ser. No. 841,282
4 Claims. (Cl. 309—52)

This invention relates to improvements in pump plunger assemblies, and more particularly, but not by way of limitation, to improved plunger rings particularly useful in direct or positive displacement pumps.

Plunger rings have been used for many years on the plungers of pumps designed to directly displace liquids and gases. In many cases these plunger rings are composed of a flexible or resilient material. The use of such resilient plunger rings permits the construction of cylinders and plungers whose tolerances are not as critical as is required for those types of pumps using metal-to-metal plungers and cylinders. Also, the resilient plunger rings have the advantage of being relatively inexpensive to manufacture and are easy to install. With plungers using resilient plunger rings, the metal parts of a plunger do not make contact with the cylinder walls of the pump. Thus, the wear in the pump mechanism is concentrated in the inexpensive and easily replaced plunger rings so that their periodic replacement results in consistent efficiency throughout the life of the pump.

Plunger rings are presently used in mechanisms comprising essentially a tubular plunger having a plurality of fixed spacers around the circumference thereof, and with plunger rings having rectangularly-shaped cross-sections compressed between the spacers. Some manufacturers have produced plungers having the spacer rings integrally formed about the periphery. The plunger rings are compressed between the spacer rings either by hand or by rolling the plunger assembly between two metal rollers. The efficiency of one popular type of pumping plunger is predicated on a tight compressive fit between the plunger rings and the spacer rings. As wear of the plunger rings develops, and as space gradually is created between the plunger rings and the spacer rings, or between the plunger rings and the pump cylinder, the pump begins to lose its efficiency through leakage past the plunger rings on the power stroke of the pump. Compensating means is not inherently available to compensate for wear which develops. Thus, the plunger rings are of necessity subject to more frequent replacement and the overall efficiency of the pumping plunger begins to decrease as soon as the slightest wear is incurred in the rings.

Another popular present day plunger construction utilizes spacer rings and plunger rings having mating grooves and beads or flanges extending circumferentially around the adjacent faces of the rings. The object of the mating grooves and beads is to promote a seal of the plunger rings between the spacer rings without the necessity of a tight compressive fit. However, such a plunger construction is expensive; wear of the outer edges of the plunger rings cannot be compensated for, and the service life of such a construction has not been substantially different from a construction wherein the plunger rings are compressed between the spacer rings.

The present invention contemplates a novel plunger assembly utilizing spacer rings around the plunger and novel plunger rings between the spacer rings to efficiently seal the plunger in a mating pump cylinder. The plunger rings are of a size to fit loosely between adjacent spacer rings and are so shaped as to be expanded radially into contact with the pump cylinder by the action of the fluid being pumped. In a preferred construction, each plunger ring is provided with a lip around its outer edge for engaging the pump cylinder, and a groove in the end face thereof facing the high pressure fluid being pumped forming a tapered surface to receive the fluid pressure in a direction to force the lip outwardly against the pump cylinder. The expansion of the plunger ring in response to the pressure of the fluid being pumped compensates for wear of the ring and provides a long service life.

It is an object of this invention to provide a plunger mechanism which will eliminate disadvantages in existing type plunger mechanisms.

Another object of this invention is to provide a plunger assembly which will not require a compressive fit between the plunger rings and spacer rings for efficient pumping.

Another object of this invention is to provide a plunger ring which will maintain a sealed fit between the cylinder walls and the plunger spacer rings, yet automatically compensate for wear.

Another object of this invention is to provide a plunger ring which will automatically increase the pressure exerted against the cylinder walls by the plunger rings in proportion to increases in the pressure of the fluid being pumped to maintain pumping efficiency at varying pressures.

A further object of this invention is to provide a plunger ring which can be easily and quickly installed on a pump plunger.

These and other objects, and a better understanding of this invention, may be had by referring to the following description and claims, taken in conjunction with the attached drawings, in which:

Figure 1:
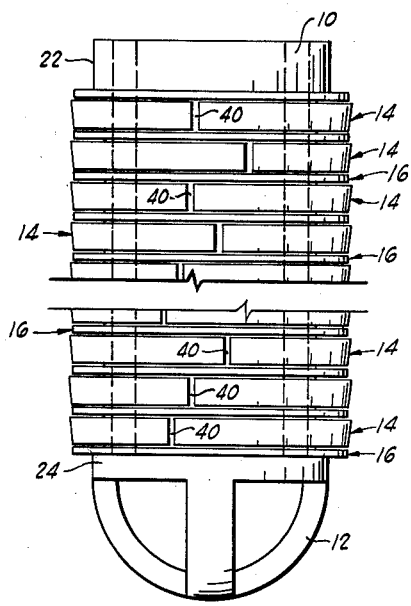
FIGURE 1 is a side view of a plunger assembly constructed in accordance with this invention.
Figure 4:
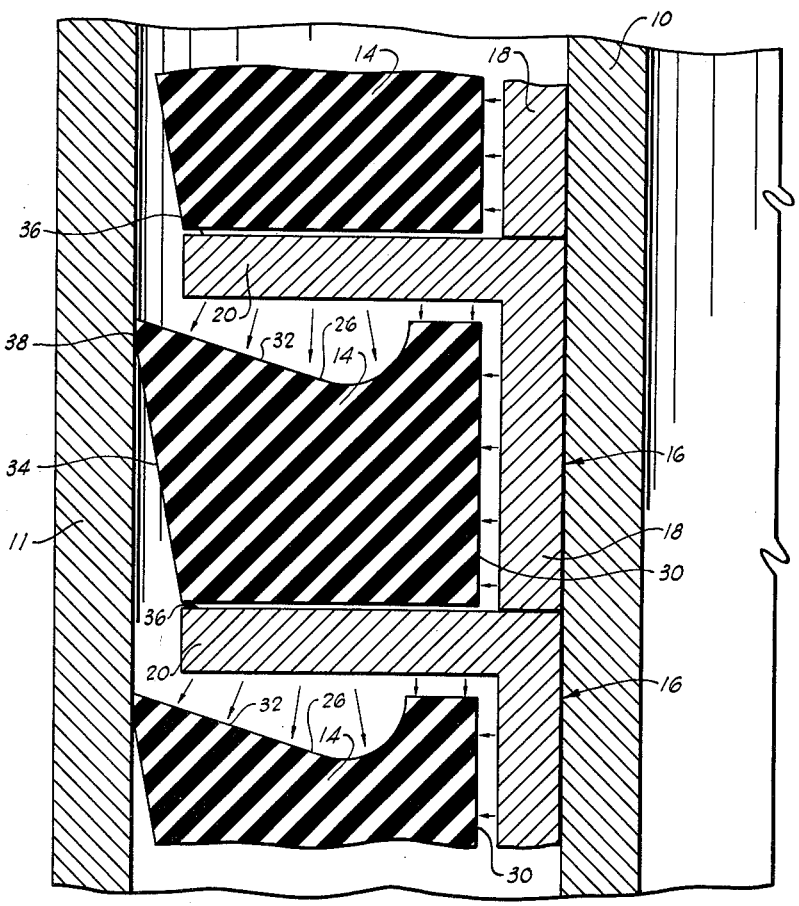
FIGURE 4 is an enlarged descriptive type view of a portion of the cross sectional view of FIG. 2, showing the action of fluid on a plunger ring during a pumping operation.

Referring to the drawings in detail, and particularly FIGS. 1 and 4, reference character 10 designates a tubular plunger which, during operation, is reciprocated in a cylinder 11 by a suitable prime mover (not shown). In this disclosure it will be assumed that fluid is being pumped upwardly by the plunger 10 and that fluid is directed through the plunger on the downstroke, with fluid in the cylinder 11 above the plunger being lifted during the upstroke. A suitable traveling valve (not shown) is normally provided in the lower end portion of the plunger 10 and is retained in the desired position by a suitable cage 12 extending over the inlet end of the plunger. A plurality of novel plunger rings 14 are held around the circumference of the plunger 10 by suitable spacer rings 16 to provide a sliding seal of the plunger in the cylinder 11, as will be more fully described below.

Figure 2:
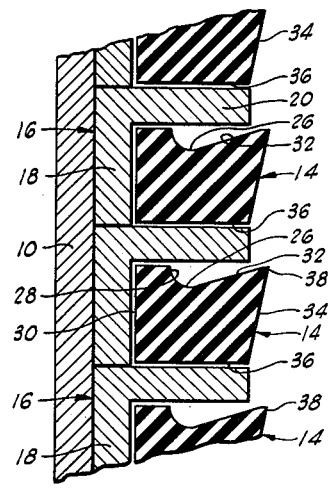
FIGURE 2 is an enlarged vertical cross sectional view of a portion of FIG. 1.

As shown in FIG. 2, each spacer ring 16 comprises a tubular body portion 18 of a size to fit rather tightly around the plunger 10, and a circumferential flange portion 20 extending outwardly from the upper end of the body portion 18. Normally, the spacer rings 16 are held in end-to-end contacting relation around the plunger 10 (see FIG. 1) by a nut 22 or the like secured on one end of the plunger pressing the rings toward a flange 24 on the opposite end of the plunger to retain the body portions 18 sealed around the plunger. However, the rings 16 may be welded to the plunger 10 or secured in any other suitable manner, the only requirement being that no leakage of fluid occur between the rings 16 and the outer surface of the plunger 10.

Each of the novel plunger rings 14 is positioned between adjacent spacer rings 16 and comprises an annular-shaped body of resilient material having a generally rectangular cross-section. As shown in FIG. 2, the vertical thickness or height of each ring 14 is slightly less than the distance between adjacent spacer ring flanges 20, while the width of each ring 14 is slightly greater than the lengths of the spacer ring flanges 20, such that each ring 14 will fit loosely between adjacent spacer rings 16 and will protrude beyond the outer edges of the spacer rings to contact the inner periphery of the cylinder 11.

An annular groove 26 is formed in the upper face of each plunger ring 14, with the inner side wall 28 of the groove extending substantially vertical in outwardly spaced relation from the inner face 30 of the respective ring, and with the outer wall 32 of the groove being tapered outwardly and extending to the outer face 34 of the respective ring 14. Also, the outer face 34 of each ring 14 is tapered downwardly and inwardly toward the lower face 36 of the ring to form a lip 38 at the upper outer edge of the ring. It will be understood that the groove 26 will be formed in the face of the plunger ring 14 which faces the highest pressure encountered by the respective plunger 10 and that the outer face 34 of the ring will be tapered inwardly from the face of the ring exposed to such highest pressure.

Figure 3:
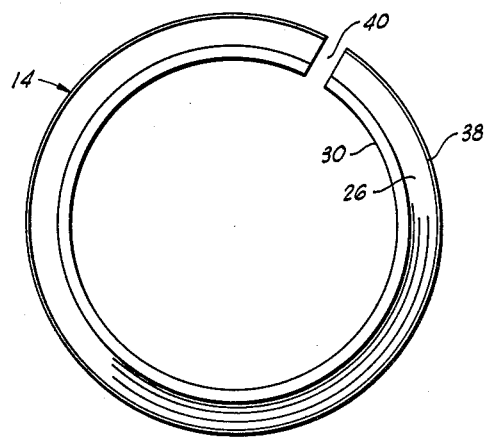
FIGURE 3 is a top view of a preferred plunger ring construction.

As shown in FIG. 3, each ring 14 is provided with a gap 40 to facilitate the assembly of the rings on the plunger 10 and to facilitate the radial expansion and contraction of the rings during use, as will be described. Each gap 40 does provide a channel through which the fluid being pumped may leak, however, when the rings are assembled on the plunger with the gaps 40 of adjacent rings in staggered relation as illustrated in FIG. 1, the total leakage of fluid across the plunger 10 will be so minor as to have no effect on the efficiency of the plunger.

The operation of each plunger ring 14 is best illustrated in FIG. 4. When the plunger 10 is moved on a pumping stroke (the upstroke in the embodiment shown) the pressure of the fluid adjacent the face of the respective ring 14 containing the groove 26 will be substantially increased and will act on the ring as indicated by the arrows in FIG. 4. This increase in pressure will act on the upper face of the ring 14 to force the lower face 36 of the ring into sealing engagement with the upper face of the lower adjacent spacer ring flange 20. Simultaneously, the high pressure fluid will enter the space between the inner face 30 of the ring and the body portion 18 of the respective spacer ring 16 to force the ring 14 outwardly toward the inner periphery of the cylinder 11. This radially outward force reacting on the inner face 30 of the ring 14 is supplemented by the downward and outward force reacting on the tapered side wall 32 of the groove 26 to press the lip portion 38 of the ring tightly against the inner periphery of the cylinder 11, whereby the plunger 10 is slidingly sealed in the cylinder 11.

As previously indicated the gap 40 in each ring 14 facilitates the radial expansion and contraction of the ring, such that each ring will be expanded radially outward by the hydraulic forces until the ring engages the cylinder 11. Therefore, each ring 14 may become worn to an appreciable extent before replacement is required. In this connection it may be noted that although the lips 38 provide the most efficient sealing action, the rings 14 may still be used when the lips 38 are substantially worn away. In any event, the rings 14 will not cease to function as seals through normal use and wear.

Since each plunger ring 14 fits loosely between the respective spacer rings 16, there is a minimum of pressure exerted between the plunger ring 14 and the cylinder 11 on the downward or non-power stroke of the pump. This is in contrast with previous types of plunger rings where pressure contact is equally maintained on the power and non-power strokes of the pump. Therefore, the wear on the plunger rings 14 of this invention will be materially reduced, insuring longer performance by the plunger assembly without the necessity of frequent repairs.

Typically, when a multitude of plunger rings 14 are assembled on a plunger assembly, fluid pressure will not be exerted on all of the plunger rings. This result is achieved because only fluid leakage past the plunger rings 14 in the advance positions will cause following plunger rings 14 to expand against the cylinder 11. Consequently, only the plunger rings 14 necessary to prevent fluid leakage past the plunger assembly will be forced against cylinder 11. The wear on the subsequent plunger rings 14 will be substantially eliminated, thus, as the plunger rings 14 furtherest advanced in the power stroke direction of the plunger assembly wear and begin to permit leakage, subsequent plunger rings 14 will come into force and effect, giving an extended life to the plunger assembly without the necessity of repairs or replacement.

Any defect or non-conformity in molding or forming the plunger rings 14 or in construction of the spacer rings 16 will not impair the efficiency of the plunger assembly, as the action of the fluid pressures on the resilient material will cause the plunger rings to conform to the spacer rings and the cylinder 11.

In operation, many pumps are subjected to varying fluid pressure loads. Using the principles of this invention, the plunger ring lip 38 of each ring 14 is forced against the cylinder 11 in direct proportion to the pressure of the liquid being pumped. If the pump is operating at a reduced pressure, the plunger rings 14 will receive reduced fluid pressures which force the rings against cylinder 11. Accordingly, energy consumption by friction within the pump automatically decreases when fluid pressures decrease, resulting in a reduction in the power required to operate the pump.

The plunger rings 14 are composed of any resilient and conformable material, and the selection of the materials used will depend upon the pressure, temperature, and chemical nature of the fluid to be pumped. Materials adaptable for use in the construction of the rings 14 include the following: synthetic buna-N-type rubber, such as sold under the trade name "Hycar"; synthetic buna N-type rubber, copolymered with an acrylonitrile, such as sold under the trade name "Butadine"; chloroprene polymer stabilized with thiuram disulfide, such as sold under the trade name "Neoprene," and chloroprene rubber, such as sold under the trade name "Duprene." Rubber, both natural and synthetic, and resilient synthetic resinous materials are included in the group of acceptable products for use in the manufacture of the rings 14.

The plunger 10 has been disclosed herein as a cylindrical member typically used in certain types of bottom hole pumps used in oil wells wherein the valving arrangement is designed to cause the pumped fluid to flow through the plunger 10. The assembly disclosed in this invention, and the elements of the assembly, are equally adaptable to solid type plunger members as are incorporated in most reciprocating pumps.

The assembly of this invention has been described with reference to a single acting plunger mechanism designed to exert fluid pressure in one direction only. It can be seen that the spacer rings 16 and plunger rings 14 may be arranged on the plunger 10 for a double acting operation wherein a part of plunger rings are disposed to exert fluid pressure when the plunger 10 is reciprocated in both directions.

Although this invention has been described with a certain degree of particularity, it is manifest that many changes may be made in the details of construction and in the materials specified without departing from the spirit or the scope of the invention as defined in the appended claims.

I claim:

1. A reciprocating pump plunger assembly alternately exposed to high and low pressure fluid at one end thereof, comprising a cylindrical plunger member, at least one spacer ring secured in sealing relation around the plunger member and having a circumferential flange portion extending radially outward from the plunger member, and a resilient plunger ring positioned around the plunger member between said one end thereof and the spacer ring flange, said plunger ring having an inner diameter larger than the outer diameter of the plunger member to provide an annular fluid space between the plunger ring and plunger member to receive high pressure fluid which acts to expand the plunger ring, said plunger ring having an outer diameter larger than the outer diameter of the spacer ring flange, and said plunger ring having a tapered portion in the end face thereof facing said one end of the plunger member extending inwardly with respect to the plunger ring and forming one side of an annular groove formed in the respective end face of the plunger ring for receiving high pressure fluid which urges the plunger ring toward the spacer ring flange, the high pressure fluid in said annular groove cooperating with the high pressure fluid in said annular space to urge the plunger ring radially outward.

2. A pump plunger assembly as defined in claim 1 wherein the outer periphery of the plunger ring is tapered inwardly and away from said one end of the plunger member to form a lip around the outer periphery of the plunger ring on the end thereof facing said one end of the plunger member.

3. A pump plunger assembly as defined in claim 1 characterized further to include a plurality of spacer rings secured around the plunger member with said circumferential flange portions being equally spaced along the plunger member, and wherein one of the plunger rings is positioned between the adjacent spacer ring flanges, each of said plunger rings having a length less than the distance between the respective spacer ring flanges, whereby high pressure fluid may react on each plunger ring to urge the plunger ring outwardly and toward the spacer ring flange adjacent the respective plunger ring which is remote from said one end of the plunger member.

4. A plunger ring comprising an annulus of resilient material having an inner peripheral face, an outer peripheral face, and a pair of end faces extending normal to its inner peripheral face, said outer peripheral face being tapered to define an acute angle with one of said end faces, said annulus further having a groove in said one end face adjacent said tapered outer peripheral face and spaced from said inner peripheral face whereby high pressure fluid received in said groove will bias said tapered outer peripheral face outwardly without biasing said inner peripheral face inwardly.

References Cited in the file of this patent
UNITED STATES PATENTS

| | | |
|---|---|---|
| 2,240,780 | Hunter | May 6, 1941 |
| 2,344,687 | Fischer et al. | Mar. 21, 1944 |
| 2,549,818 | Joy | Apr. 24, 1951 |
| 2,633,808 | Webber | Apr. 7, 1953 |
| 2,687,335 | Bowerman | Aug. 24, 1954 |
| 2,742,333 | Taylor | Apr. 17, 1956 |